UNITED STATES PATENT OFFICE.

FRITZ ACH, OF MANNHEIM, GERMANY, ASSIGNOR TO THE FIRM OF C. F. BOEHRINGER & SOEHNE, OF MANNHEIM-WALDHOF, BADEN, GERMANY.

THIOXANTHIN AND PROCESS OF MAKING SAME.

SPECIFICATION forming part of Letters Patent No. 708,513, dated September 9, 1902.

Application filed July 27, 1901. Serial No. 69,987. (No specimens.)

*To all whom it may concern:*

Be it known that I, FRITZ ACH, a citizen of the German Empire, residing at Mannheim, Germany, have invented certain new and useful Improvements in the Manufacture of Thioxanthins; and I do hereby declare the following to be a full, clear, and exact description of the invention, such as will enable others skilled in the art to which it appertains to make and use the same.

The present invention relates to the manufacture of derivatives of xanthin or its homologues in which the hydrogen atom bound to the carbon atom in the position 8 is replaced by the radical HS—*i. e.*, the so-called "thioxanthins." Such thioxanthins—as, for example, the simplest thioxanthin with the structural formula

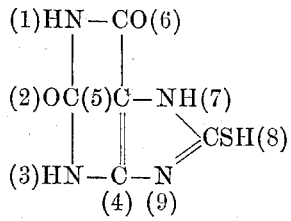

or

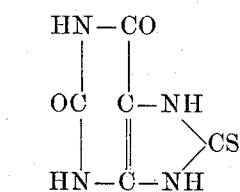

(see *Ber. d. D., Chem. Ges.*, Vol. 31, page 431)—could only be obtained up to the present date by the action of potassium sulfhydrate on the corresponding halogen-xanthins. (See *Berichte der Deutschen Chemischen Gesellschaft*, Vol. 31, page 431, and Letters Patent of the United States No. 625,441.) I have found that these compounds are capable of being prepared direct from uric acid by the action of carbon bisulfid on alkali salts of uric acid proper or its alkyl derivatives in aqueous solution or suspension. This reaction takes place with evolution of carbon dioxid and sulfureted hydrogen.

The most convenient way for carrying out my invention consists in heating under pressure a mixture of an acid alkali salt of uric acid proper or its homologues with carbon bisulfid in the presence of water. According to experiments and observations hitherto made the uric acids which are susceptible to the above reaction are uric acid proper and the derivatives of the same in which the alkyl radical or radicals are bound to the alloxan nucleus—such, for example, as 3-methyl-uric acid or 1-3-dimethyl-uric acid—while those uric acids in which the alkyl radical or radicals are bound to the nitrogen atoms occupying the positions 7 or 9 are not changed on treating them with carbon bisulfid. My present invention may, therefore, be generically expressed by the following equation:

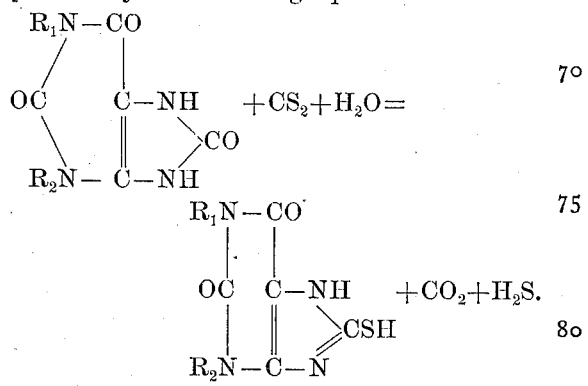

This new process enables one for the first time to proceed directly and in one operation from a uric acid to a thioxanthin.

In order to enable those skilled in the art to practice my invention, I will now describe the same in detail with the aid of several examples constituting the preferred embodiment of the same. The proportions are all given by weight.

I. *Preparation of 8-thioxanthin from uric acid.*—Five parts of the mono-potassium salt of uric acid are heated together with sixty parts of water and three parts of carbon bisulfid about seven hours in a closed vessel to a temperature of about 150° centigrade, the whole being well stirred during the operation. After cooling, the carbon dioxid and sulfureted hydrogen which have been formed are allowed to escape and the crystalline and almost-colorless mass is separated by filtration from the mother-liquor. This crystalline mass consists of a mixture of thioxanthin proper and the mono-potassium salt of thioxanthin. By boiling the mixture with water the mono-potassium salt readily goes into solution, from which the thioxanthin can be precipitated by mineral acids. The product has the formula

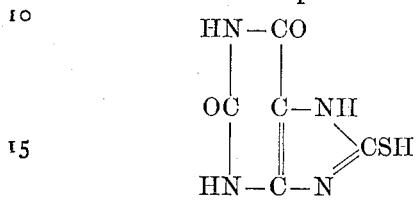

and possesses the properties ascribed to it in *Berichte der D. Ch. Ges.*, XXXI, 445.

II. *Preparation of 3-methyl-8-thioxanthin from 3-methyl-uric acid.*—One part of 3-methyl-uric acid, 0.31 parts of potassium hydrate, (KOH,) and twelve parts of water are heated with 0.6 parts of carbon bisulfid for about six hours in a closed vessel, such as an autoclave, to a temperature of about 150° centigrade, the whole being well stirred during the operation. After cooling, the gases which have been formed are allowed to escape and the crystalline mass which remains in the vessel is removed from the same and separated by filtration. The product is purified by recrystallization from water, from which it separates in bright-yellow shining lamina. The analysis of the thus-purified compound confirms the formula $C_6H_6N_4SO_2$. The structural constitution is the following:

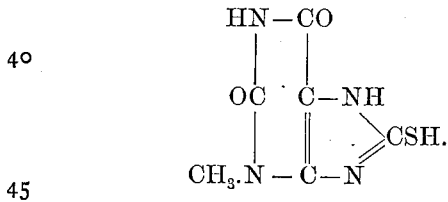

This new compound dissolves in about four hundred parts of boiling water. It begins to decompose at a temperature of about 340° centigrade, at which point it likewise begins to soften and melts partially.

The ammoniacal solution of the 3-methyl-8-thioxanthin yields with silver-nitrate solution the yellow gelatinous precipitate characteristic of thioxanthins.

III. *Preparation of 1-3-dimethyl-8-thioxanthin from 1-3-dimethyl-uric acid.*—One part of 1-3-dimethyl-uric acid, 0.3 parts of potassium hydrate, (KOH,) and twelve parts of water are heated with 0.6 parts of carbon bisulfid for about six hours in a closed vessel to a temperature of about 150° centigrade, the whole being well stirred during the operation. After cooling, the gases which have been formed are allowed to escape and the crystalline mass is separated by filtration. These crystals consist of almost pure 1-3-dimethyl-8-thioxanthin $C_7H_8N_4SO_2+H_2O$, as an analysis of the purified product confirmed.

The structural formula of this new product is:

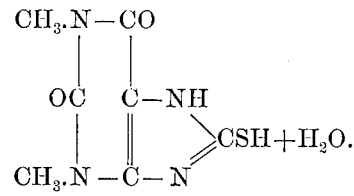

It is soluble in about two hundred and fifty parts of boiling water and crystallizes therefrom in thin long snow-white needles. It melts at a temperature of about 320° centigrade under decomposition. The ammoniacal solution of the compound gives with silver-nitrate solution the yellow gelatinous precipitate characteristic of thioxanthins.

Having thus fully described my invention, what I claim as new, and desire to secure by Letters Patent, is—

1. In the art of preparing thioxanthins, the process which consists in reacting upon an uric acid with carbon bisulfid.

2. The process which consists in reacting upon an alkali salt of an uric acid with carbon bisulfid.

3. The process which consists in reacting upon an acid alkali salt of an uric acid with carbon bisulfid.

4. The process which consists in heating an acid alkali salt of an uric acid with carbon bisulfid.

5. The process which consists in heating an acid alkali salt of an uric acid with carbon bisulfid in the presence of water.

6. The process which consists in heating an acid alkali salt of an uric acid with carbon bisulfid and water under pressure in a closed vessel.

7. The process which consists in heating the mono-potassium salt of an uric acid with carbon bisulfid and water under pressure in a closed vessel.

8. The process which consists in heating the mono-potassium salt of 3-methyl-uric acid with carbon bisulfid and water in a closed vessel to a temperature of about 150° centigrade.

9. As a new chemical compound, 3-methyl-8-thioxanthin whose formula is $C_6H_6N_4SO_2$, which decomposes on heating at about 340° centigrade, dissolves in about four hundred parts of boiling water, crystallizes from the same in the form of bright-yellow laminæ and has all the properties characteristic to the thioxanthins.

In testimony whereof I affix my signature in presence of two witnesses.

FRITZ ACH.

Witnesses:
JACOB ADRIAN,
H. W. HARRIS.